Patented Apr. 8, 1941

2,237,763

UNITED STATES PATENT OFFICE 2,237,763

STEROL DERIVATIVES AND PROCESS OF MAKING SAME

Russell Earl Marker, State College, Pa., assignor to Parke, Davis & Company, Detroit, Mich., a corporation of Michigan No Drawing. Original application March 12, 1937, Serial No. 130,581. Divided and this application June 20, 1938, Serial No. 214,842

12 Claims. (Cl. 260—397)

The invention relates to production of new sterol derivatives.

This application is a division of my application, Serial No. 130,581, filed March 12, 1937. The parent application is directed to the preparation of 7-keto-cholestane by reducing a 7-keto-cholesteryl halide.

The present application is directed more particularly to the preparation of 7-hydroxy steryl halides and their esters by reducing a 7-keto $\Delta^5$-unsaturated steryl halide. For example, 7-keto-cholesteryl chloride may be reduced without the use of hydrogen gas to 7-hydroxy-cholesteryl chloride, and the latter product may be converted into its esters and into other derivatives.

In the parent application, above referred to, it was shown that 7-hydroxy-cholesteryl chloride could be transformed by catalytic hydrogenation into 7-hydroxy-cholestyl chloride, and this in turn reduced to 7-hydroxy-cholestane and then oxidized to 7-keto-cholestane. The instant application is directed more particularly to the transformation of 7-keto-cholesteryl halides into 7-hydroxy-cholesteryl halides, and then by acylation into esters of 7-hydroxy-cholesteryl halide.

The process, however, is not limited to cholesteryl compounds but may be applied to the conversion of any 7-keto $\Delta^5$-unsaturated steryl halide into the corresponding 7-hydroxy steryl halides and their esters.

In my copending application, Serial No. 130,583, filed March 12, 1937, now Patent No. 2,177,355, issued October 24, 1939, 7-keto-cholesteryl halides, such as 7-keto-cholesteryl chloride, are described. Since this material is one which may be used in the present invention, I will repeat below a method by which it may be obtained from the known product, cholesteryl chloride.

*7-keto-cholesteryl chloride from cholesteryl chloride.*—To a solution of 203 g. of cholesteryl chloride in 3500 cc. of acetic acid kept at 55° is added with stirring over a one-hour period a solution of 150 g. of chromic oxide in 100 cc. of water and 100 cc. of glacial acetic acid. The solution is stirred during an additional two hours. Ethyl alcohol is added and the reaction mixture concentrated under reduced pressure at 55° to a volume of 1.5 liters. To this is added 100 cc. of water and the mixture is cooled over night. The crystalline material is filtered, washed with 600 cc. of alcohol followed by 300 cc. of acetone and is finally crystallized from acetone. The 7-keto-cholesteryl chloride thus obtained has a melting-point of 145°. Yield 50 g. The melting-point of the semicarbazone is 176°.

Anal. calcd. for $C_{27}H_{43}OCl$: C, 77.4; H, 10.3. Found: C, 77.8; H, 10.2.

Anal. calcd. for $C_{28}H_{46}OClN_3$: C, 70.7; H, 9.7. Found: C, 70.5; H, 10.0.

*7-hydroxy-cholesteryl chloride.*—To a solution of 40 g. of 7-keto-cholesteryl chloride (m. 145°) in 510 cc. of dry isopropyl alcohol there is added 30 g. of distilled aluminum isopropylate. The mixture is refluxed for 5 hours after which 250 cc. of isopropyl alcohol is distilled off over a period of 4 hours. The residue is poured into 1300 cc. of 3 percent potassium hydroxide solution and shaken vigorously. The product is extracted with ether, the solvent concentrated to 100 cc. and 100 cc. of acetone added. Crystals separate on cooling which are recrystallized from acetone. Yield 31 g., m. 142°.

Anal. calcd. for $C_{27}H_{45}OCl$: C, 77.1; H, 10.7. Found: C, 77.0; H, 10.8.

*Benzoate of 7-hydroxy-cholesteryl chloride.*—A solution of 22.6 g. of 7-hydroxy-cholesteryl chloride in 150 cc. of dry pyridine is cooled in ice and 50 cc. of benzoyl chloride added in small portions with shaking. The solution is allowed to stand at room temperature for 2 days after which it is poured into 4 liters of water and allowed to stand over night. The water is decanted and the residue dissolved in ether, the ether solution being washed with sodium carbonate solution after which it is concentrated to 100 cc. and 200 cc. of methyl alcohol added. After standing over night, crystals form which are recrystallized from acetone. Yield 11 g., m. 119°.

Anal. calcd. for $C_{34}H_{49}O_2Cl$: C, 77.91; H, 9.4. Found: C, 78.2; H, 9.6.

The transformations involved in the above examples may be illustrated by the following formulas and diagrams:

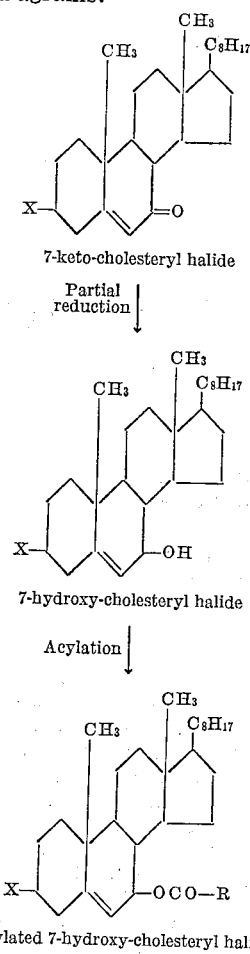

7-keto-cholesteryl halide

Partial reduction ↓

7-hydroxy-cholesteryl halide

Acylation ↓

Acylated 7-hydroxy-cholesteryl halide

The invention is not limited to the examples given, since many variations are possible without departing from the spirit of the invention as specified in the appended claims. For example, although the examples refer to 3-chloro-compounds, the invention is not limited to these, but other equivalent 3-halogeno-compounds can also be substituted for the chloro-compounds. Moreover, it is obvious that instead of using benzoyl chloride as described above in the preparation of the acylated 7-hydroxy-cholesteryl chloride, any other acylating agent of the same type may be used.

As indicated above, the invention is not limited to the particular examples given but is broadly directed to the transformation of 7-keto Δ$^5$-unsaturated steryl halides into the previously unknown 7-hydroxy steryl halides and their esters.

What I claim as my invention is:

1. Process for the preparation of a 7-hydroxy steryl halide ester which comprises reacting a 7-keto Δ$^5$-unsaturated steryl halide with a metal alcoholate capable of reducing a ketone to a secondary alcohol, thereby obtaining a 7-hydroxy steryl halide, and acylating said compound to obtain an ester of the 7-hydroxy steryl halide.

2. The step which comprises reacting a 7-keto Δ$^5$-unsaturated steryl halide with a metal alcoholate capable of reducing a ketone to a secondary alcohol thereby obtaining a 7-hydroxy steryl halide.

3. Process for the preparation of a 7-hydroxy-cholesteryl halide ester which comprises reacting a 7-keto-cholesteryl halide with a metal alcoholate capable of reducing a ketone to a secondary alcohol, thereby obtaining a 7-hydroxy cholesteryl halide compound, and treating said compound with an acylating agent to obtain an ester of the 7-hydroxy-cholesteryl halide compound.

4. The step which comprises reacting a 7-keto cholesteryl halide with a metal alcoholate capable of reducing a ketone to a secondary alcohol thereby obtaining a 7-hydroxy cholesteryl halide.

5. The step which comprises reacting 7-keto-cholesteryl chloride with a metal alcoholate capable of reducing a ketone to a secondary alcohol thereby obtaining 7-hydroxy-cholesteryl chloride.

6. Process for the preparation of an ester of 7-hydroxy-cholesteryl chloride which comprises reacting a 7-keto-cholesteryl chloride compound with a metal alcoholate capable of reducing a ketone to a secondary alcohol, and treating said compound with an acylating agent to obtain an ester of 7-hydroxy-cholesteryl chloride.

7. Process for the preparation of the benzoate of 7-hydroxy-cholesteryl chloride which comprises reacting 7-keto-cholesteryl chloride with a metal alcoholate capable of reducing a ketone to a secondary alcohol to obtain 7-hydroxy-cholesteryl chloride, and treating with benzoyl chloride to obtain the benzoate of 7-hydroxy-cholesteryl chloride.

8. A 7-hydroxy steryl halide.
9. A 7-hydroxy-cholesteryl halide.
10. A 7-hydroxy-cholesteryl chloride.
11. The benzoate of 7-hydroxy-cholesteryl chloride.
12. The process for obtaining 7-hydroxy cholesteryl chloride which comprises reacting 7-keto-cholesteryl chloride with aluminum isopropylate.

RUSSELL EARL MARKER.